United States Patent [19]

Jendrichowski

[11] 4,062,441
[45] Dec. 13, 1977

[54] APPARATUS FOR CONVEYING BOTTLES

[75] Inventor: Klaus Jendrichowski, Holzwickede, Germany

[73] Assignee: Holstein and Kappert Aktiengesellschaft, Dortmund-Wambel, Germany

[21] Appl. No.: 740,197

[22] Filed: Nov. 9, 1976

[30] Foreign Application Priority Data

Nov. 21, 1975 Germany .............................. 2552211

[51] Int. Cl.² .......................................... B65G 47/04
[52] U.S. Cl. .................................. 198/480; 198/408; 198/631
[58] Field of Search ............... 198/408, 409, 480, 489, 198/490, 792, 631

[56] References Cited

U.S. PATENT DOCUMENTS

| 1,870,504 | 8/1932 | Gruetter | 198/409 |
|---|---|---|---|
| 2,371,140 | 3/1945 | Alling et al. | 198/409 |
| 2,497,767 | 2/1950 | Hallead | 198/408 |
| 2,858,929 | 11/1958 | Vamvakas | 198/480 |
| 2,861,670 | 11/1958 | Read et al. | 198/408 |
| 3,081,859 | 3/1963 | Meyer et al. | 198/409 |
| 3,220,532 | 11/1965 | Vamvakas | 198/408 |
| 3,370,689 | 2/1968 | van der Winden | 198/408 |
| 3,601,241 | 8/1971 | Kuhut et al. | 198/792 |
| 3,625,336 | 12/1971 | Fuwa et al. | 198/456 |
| 3,729,085 | 4/1973 | Schlueter et al. | 198/792 |

Primary Examiner—Evon C. Blunk
Assistant Examiner—Richard K. Thomson
Attorney, Agent, or Firm—Toren, McGeady and Stanger

[57] ABSTRACT

In moving bottles to and from a cleaning machine, the bottles are transported over a stationary support surface by drivers formed on a plurality of juxtaposed rotating discs. Each disc has a pair of angularly spaced drivers and rotates about a common axle. During rotation of the disc, the axle moves transverse to its axial direction back and forth along a substantially straight path. For each complete back and forth movement of the axle, the disc rotates through one-half of a revolution so that one driver of each pair transports one or more bottles from a first station to a second station while the other driver of each pair returns from the second station to the first station.

4 Claims, 2 Drawing Figures

APPARATUS FOR CONVEYING BOTTLES

SUMMARY OF THE INVENTION

The present invention is directed to an apparatus for transporting containers, such as bottles, over a stationary supporting surface, such as for feeding bottles to and removing them from a cleaning machine, and, more particularly, it concerns a transfer unit consisting of several juxtaposed discs each containing a pair of drivers and with the discs rotating about a common axle.

The use of return bottles in the beverage industry requires that the bottles, after they have been returned by the consumer, are cleaned, filled and resealed. In carrying out these various operations the bottles are fed to several treatment stations or machines. Special conveyers are known which move bottles from a base or transporter into another position, for example, into the receiving cells of a cleaning machine or from such cells. Not only is there a predetermined difference in height bridged by the machine construction, but the bottles are also deflected, depending on the position of the axis of a receiving cell. A corresponding change must also be effected when removing the bottles from crates. In carrying out such operations, feeding and delivery devices are known which move the bottles along a stationary supporting surface between a transporter and a bottle crate. These transfer devices include several juxtaposed discs each equipped with drivers that engage the bottles from the bottom as they are discharged from a cleaning machine and move them along a curved track to bottle crates. The drivers perform a circular movement so that auxiliary equipment is needed in the end stage of the inserting operation for pushing the bottles fully into the moving cells of the crates. To avoid such auxiliary equipment, the stationary support has been designed in some instances as a swivel surface, so that in the end stage of the transfer operation a certain inclination is provided which permits the bottles, already accelerated, to slide into the cells. With particularly wide supporting surfaces, the load is relatively high, due to the great number of bottles supported by the surface, whereby a heavy construction in combination with considerable mechanical effort is required to perform the swivel movement.

Using an apparatus of the general type described above, it is the object of the present invention, using a stationary table surface or a corresponding supporting surface, to provide the insertion by the transfer device into receiving cells without using any auxiliary equipment. Further, the discs and their drivers rotate as a variable speed which is relatively low as a bottle is picked up and delivered but is much higher during the transfer between the pick-up and delivery stations.

In accordance with the present invention, apparatus of the above-described type is arranged so that the axle of the rotating discs can be moved back and forth in a direction transverse to the axial direction of the axle and along a substantially straight path in the direction of movement of the bottles from the pick-up to the delivery stations. During each back and forth movement of the common axle of the discs, one of the drivers on the discs moves from the pick-up position to the delivery position while the other driver moves in the reverse direction from the delivery position to the pick-up position. Furthermore, the common axle rotates constantly and performs a half revolution during each complete back and forth movement along its predetermined path.

It has been found to be expedient to support the common axle of the discs on a rocking arm supported at a pivot point below the transfer device and with a connecting rod extending between the axle and a constantly rotating crank. In another embodiment of the invention, the common axle is supported on a slide with the slide attached to the connecting rod of the constantly rotating crank.

The essential advantage of the present invention is that a single device can be used in feeding bottles into the cells of a cleaning machine. The drivers on the juxtaposed rotating discs engage the bottles which bear on a supporting surface and move them over the surface and completely into the bottle cells. As the bottle or bottles are picked up by the drivers the feed velocity is relatively slow, it increases by a multiple during the main part of the transfer operation and then decreases as the bottles are delivered into cells or to a delivery station. This variation in the feed velocity results from the back and forth movement of the common axle of the transfer device. Due to the arrangement of the path of movement of the drivers, the otherwise customary auxiliary means for inserting bottles into the cells or the delivery station, can be eliminated.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE DRAWING

Figure 1:
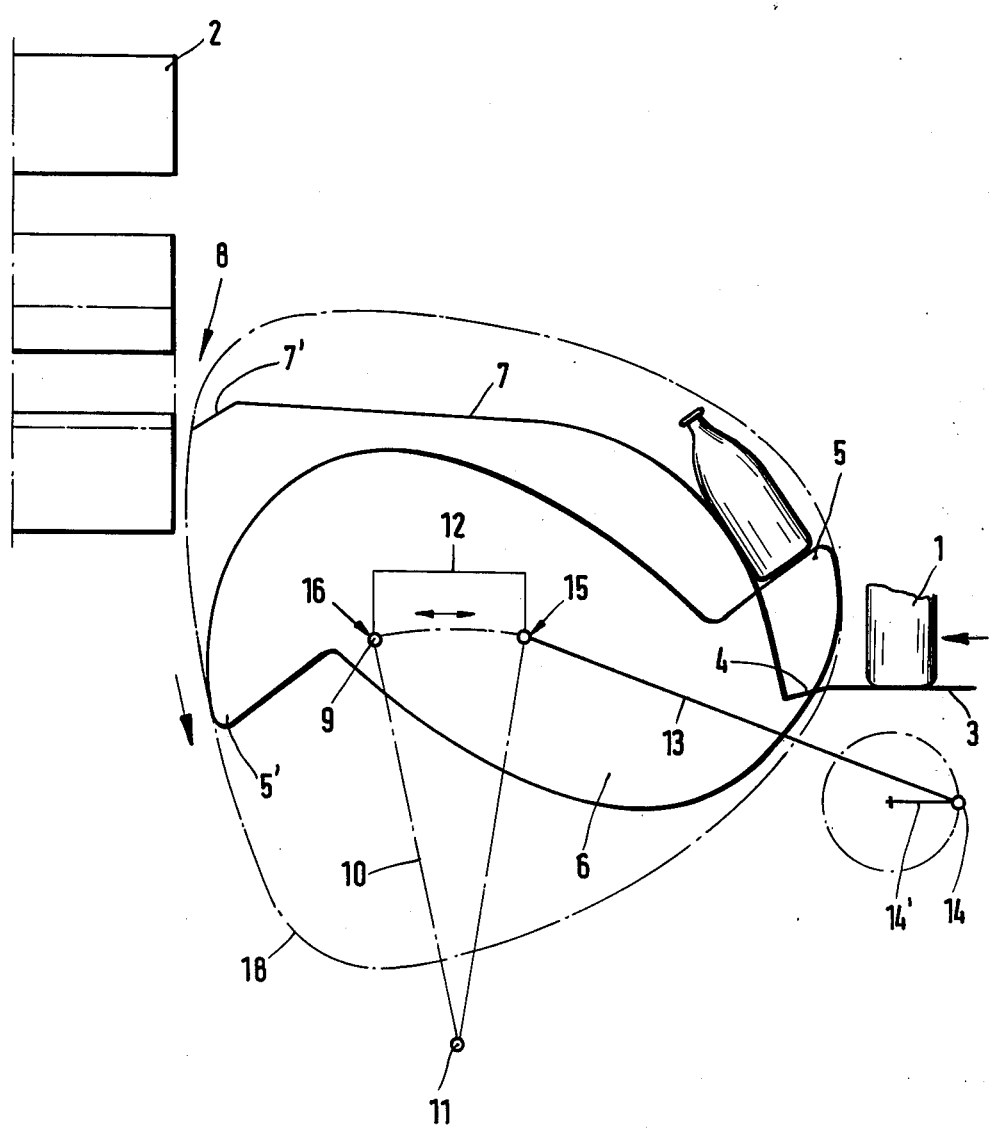
FIG. 1 is a schematic illustration of apparatus embodying the present invention.

In the drawing a transfer device is shown for feeding vertically supplied bottles 1 into horizontally aligned receiving cells in a bottle cleaning machine, not shown. The cells 2 can move intermittently or continuously and conduct the bottles 1 through various treatment baths up to the discharge end, not shown, of the machine. At the discharge end, another transfer device can be provided similar to FIG. 1. Bottles 1 are conveyed along a transporter 3 which terminates in a downwardly inclined transfer plate 4 through which plate the drivers 5 on disc 6 rotate constantly during continuous operation. Though only a single disc 6 is shown in FIG. 1 a plurality of such discs are used in effecting the bottle transfer operation. Extending upwardly from the end of the transfer plate 4 is a curved supporting surface 7. The supporting surface 7 can be constructed of a plurality of juxtaposed bars, extending in the feeding direction, so that the drivers can pass unhindered between adjacent bars. At the opposite end of the supporting surface 7 from transfer plate 4, is a downwardly inclined supporting surface section 7' which permits the unhindered insertion of the bottles 1 into the cells 2, even though the cells are moving continuously.

A common axle 9 supports the juxtaposed discs 6 for rotation and the axle is supported on one end of a rocking arm 10 which moves back and forth about an axis 11 over a path segment 12. Though the path segment 12 has a slight curvature, for the purposes of this description it is considered to be a substantially straight path. Further, axle 9 is secured to one end of a connecting rod the other end of which is fixed on the circumferential periphery of a crank drive 14. The crank drive 14 includes a crank 14' and during one full revolution of the crank the rocking arm undergoes a full working stroke, that is, it moves the axle from the starting position 15 to the end position 16 and then returns it to the starting position. On the other hand, the drivers 5, 5' on each of the discs perform a half revolution, that is, as viewed in FIG. 1 the driver 5 moves from the transfer plate 4 to the transfer point 8 and, at the same time, the other driver 5' moves from the transfer point 8 to the transfer plate 4. Due to the superimposition of these movements, the supporting surface of the drivers 5, 5' passes along a curve represented by the broken line 18. Accordingly, the drivers move upwardly or downwardly a relatively small distance, as can be seen from FIG. 1, in moving the bottles from the transfer plate 4 to the transfer point 8.

The incoming bottles moving along the transporter 3 are displaced by a baffle plate, not shown, in the direction of the drivers 5, 5' until the bottles of the bottles bear on the transfer plate 4 and their sides rest against the supporting surface 7. As soon as axle 9 reaches position 15 on the segment path 12, the drivers 5 arrive under the bottles 1 and commence the movement of the bottles along the supporting surface 7 to the transfer point 8, at which point the bottles 1 are inserted fully into the receiving cells 2. During this movement along line 18, after the bottles have been contacted by the drivers 5, the velocity of their movement is accelerated until the bottles approach the transfer point 8 at which time the acceleration stops shortly before the bottles are transferred into the receiving cells, due to the descending curve of the line 18 with the deceleration effecting the transfer of the bottles into the cells without any risk. As soon as the drivers 5 have reached the transfer point 8, the other drivers on the discs reach the level of the transfer plate 4, ready to receive another row of bottles which have been moved onto the plate during the rotation of the discs 6.

Figure 2:
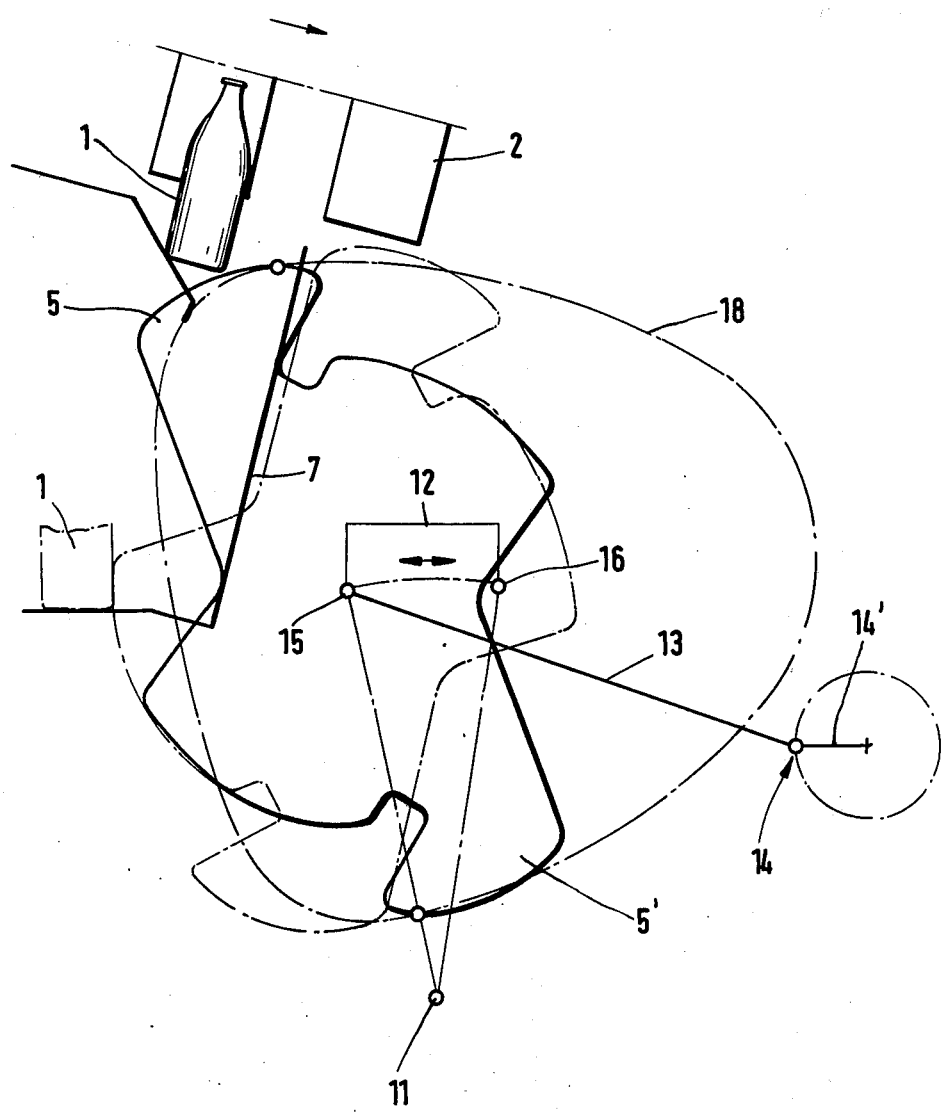
FIG. 2 is a schematic illustration of another embodiment of the invention.

In the embodiments represented in the drawing a rocking arm is selected as the support for the axle as it effects its back and forth movement. However, it is also possible to mount the axle 9 on a slide and to connect it in the above-described manner with the connecting rod 13 of the crank drive 14. The arrangement of the individual drives, as well as the support of the rocking arm below the transfer device, can be varied to vary the curve of the track or path of movement of the bottles. In a similar manner it is also possible to use the above-described apparatus for removing bottles from the receiving cells 2 where the drivers 5, 5' on the discs are designed to receive a row of bottles, as shown in FIG. 2. By using the arrangement embodying the present invention it is possible to eliminate the customary transfer devices which are otherwise needed in effecting the completion of the transport of the bottles between two stations.

While specific embodiments of the invention have been shown and described in detail to illustrate the application of the inventive principles, it will be understood that the invention may be embodied otherwise without departing from such principles.

What is claimed is:

1. Apparatus for conveying bottles and like containers to or for removing the bottles from a cleaning machine, including a stationary supporting surface extending between a first station and a second station, a transfer device for moving bottles over said supporting surface between the first station and the second station, said transfer device comprising an axle, and a plurality of juxtaposed discs rotatably mounted on said axle, each said disc having a pair of drivers space angularly apart around the circumferential periphery of said disc, wherein the improvement comprises means for moving said axle of said discs back and forth along a substantially straight path in the direction between the first station and the second station which direction is transverse to the axial direction of said axle, and said drivers each traversing one-half of a revolution of said disc for each back and forth movement of said axle.

2. Apparatus, as set forth in claim 1, wherein said means for moving said axle comprises a rocking lever supporting said axle, said rocking lever mounted for pivoting about a point spaced from said axle, a rotating crank spaced from said axle and said rocking lever, and an elongated connecting rod having one end thereof attached to said axle and the other end thereof connected to said crank so that said axle supported on said rocking lever effects one back and forth movement during each one full revolution of said crank.

3. Apparatus, as set forth in claim 1, wherein said means for moving said axle comprises a slide supporting said axle, a rotating crank spaced from said slide, and an elongated connecting rod having one end thereof attached to said axle and the other end connected to said crank so that said axle supported on said slide effects one back and forth movement thereon during each one full revolution of said crank.

4. Apparatus, as set forth in claim 1, wherein said supporting surface has a generally horizontally disposed section and an inclined section extending downwardly from the end of said horizontal section so that said bottles being conveyed on said supporting surface can be directed over said downwardly inclined section into a receiving cell.

* * * * *